Dec. 30, 1969 P. G. JONSSON ET AL 3,487,174

PULSE TRANSMISSION DEVICE FOR INTERTRAFFIC EQUIPMENT IN LOUDSPEAKER PRIVATE BRANCH EXCHANGES

Filed Aug. 11, 1965 4 Sheets-Sheet 1

Dec. 30, 1969 P. G. JONSSON ET AL 3,487,174
PULSE TRANSMISSION DEVICE FOR INTERTRAFFIC EQUIPMENT
IN LOUDSPEAKER PRIVATE BRANCH EXCHANGES
Filed Aug. 11, 1965 4 Sheets-Sheet 3

United States Patent Office 3,487,174
Patented Dec. 30, 1969

3,487,174
PULSE TRANSMISSION DEVICE FOR INTERTRAFFIC EQUIPMENT IN LOUDSPEAKER PRIVATE BRANCH EXCHANGES

Per Gustaf Jonsson, Sorlid, Ronninge, and Arne Bogestam, Farsta, Sweden, assignors to International Standard Electric Corporation, New York, N.Y., a corporation of Delaware
Filed Aug. 11, 1965, Ser. No. 478,793
Claims priority, application Sweden, Aug. 25, 1964, 10,195/64
Int. Cl. H04m 1/26
U.S. Cl. 179—86 1 Claim

ABSTRACT OF THE DISCLOSURE

Pulse transmission and receiving apparatus is provided for loudspeaker private branch telephone exchanges. The transmission apparatus includes a pulse relay having a transfer contact with each line wire of a pair of line wires in the system. The receiving apparatus includes two relay coils connected in parallel across the line wires. The pulse relay supplies battery and ground alternately over the transfer contacts to the line wires. Each relay coil has a rectifier connected in series with it across the lines to provide for polarization of the relay. To operate the system, digits representing call numbers are divided into two groups with the digits of the first group having battery voltage on one line wire as their first pulse and the digits of the second group having ground voltage on the same line wire as their first pulse.

This invention refers to a pulse transmission device to be utilized in connection with intertraffic equipment in loudspeaker private branch exchanges.

The trunk lines connecting two telephone exchanges of this type comprise two-wire lines, and in order to make possible traffic between two individual exchanges designed on a four-wire basis over these two-wire trunk lines intertraffic equipment for adapting the four-wire network to the two-wire connection is necessary.

The principal objective of the invention is to attain rapid transmission of digits on the trunk lines, as keying in the loudspeaker private branch exchanges is accomplished by button pulsing, which in itself is very rapid-working.

In order to attain this rapid transmission of digits on the trunk lines the invention utilizes a pulse transmission device for which it is characteristic that its output side (directed towards an interworking loudspeaker private branch exchange) is provided with a pulse relay having a transfer contact in each line wire. Each line wire in turn is connected to said interworking loudspeaker private branch exchange and the line wires of the receiving side of the device are terminated by two relay coils connected in parallel. Each of the coils, together with a rectifier, is connected in a bridge circuit. The transfer contacts are adapted to connect battery voltage to one of said line wires and ground voltage to the other in one of their positions and to connect ground voltage to said one line wire and battery voltage to the other in their second positions. The rectifiers being thus polarized, one passes battery voltage to its associated relay coil and the other passes ground voltage to its associated relay coil. The digits of the call numbers are divided into two groups with the digits of the first group having battery voltage on said one line wire as their first pulse and the digits of the second group having ground voltage on the same line wire as their first pulse, or the reverse.

Figure 1:
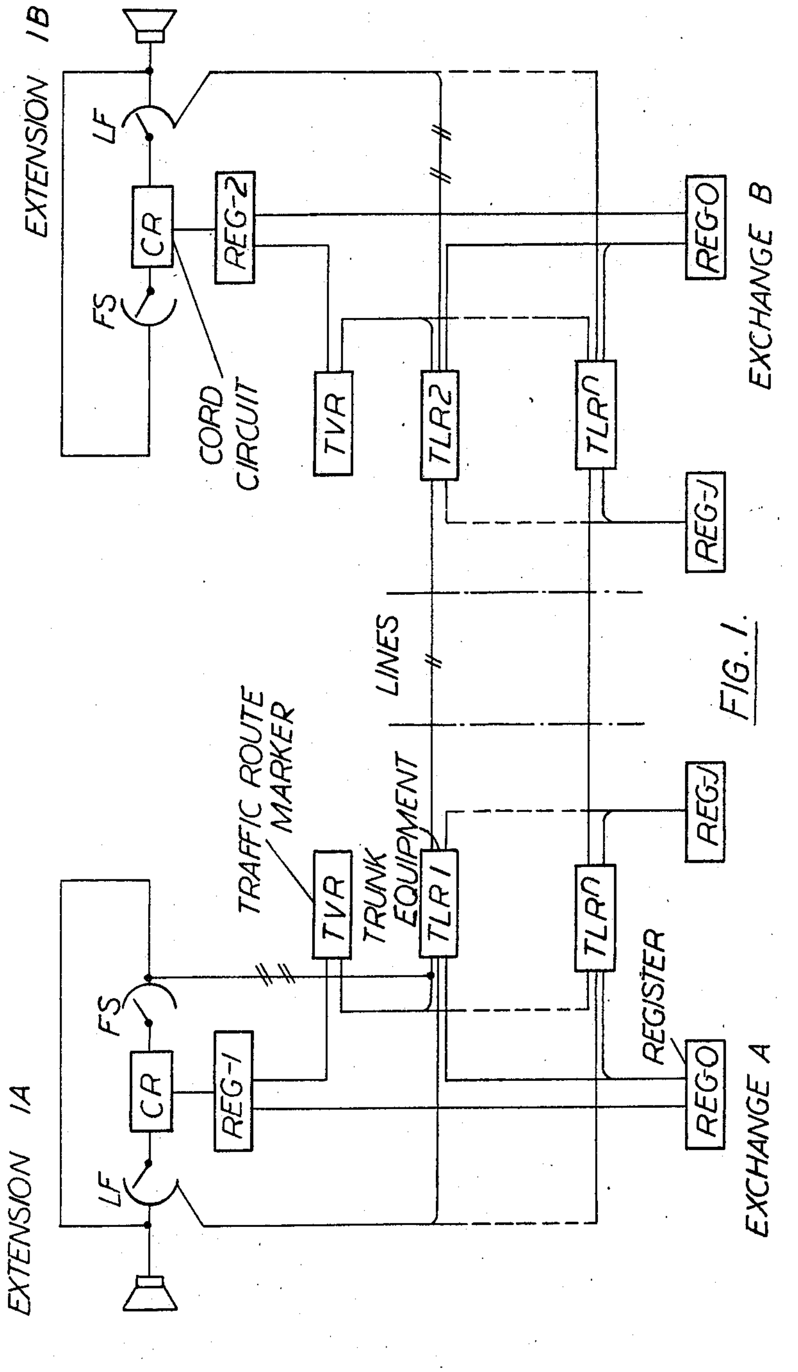
Figure 2:
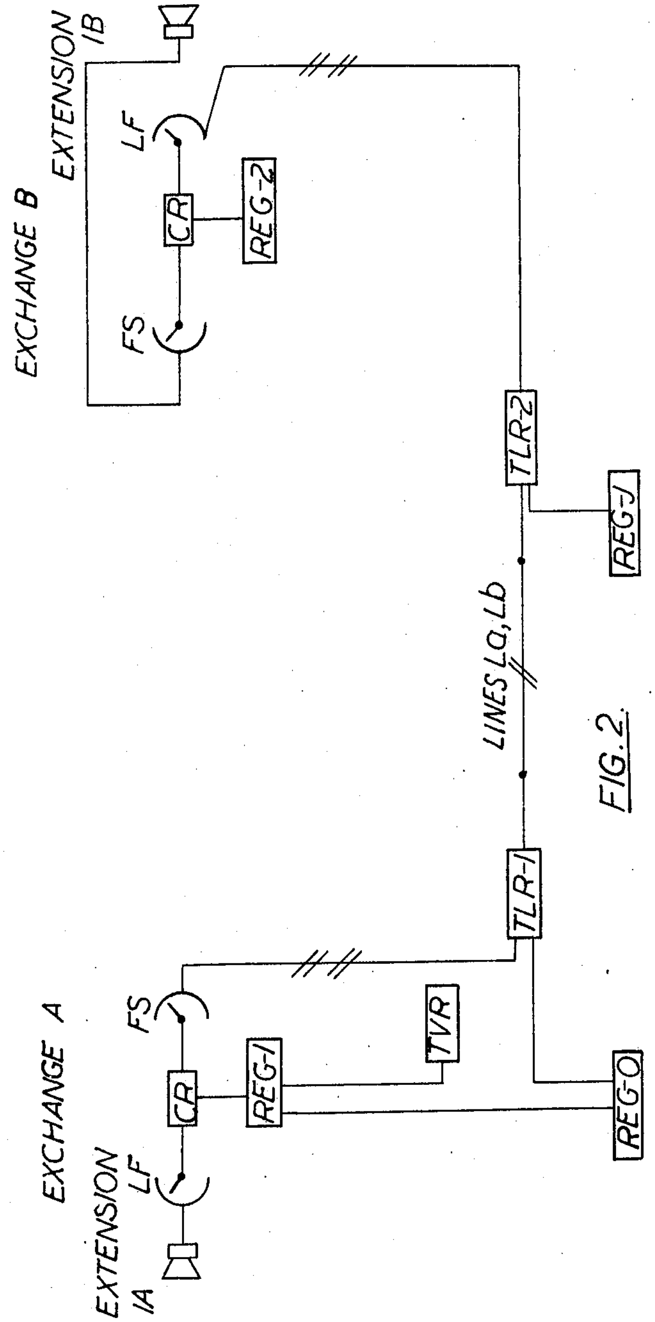
Figure 3:
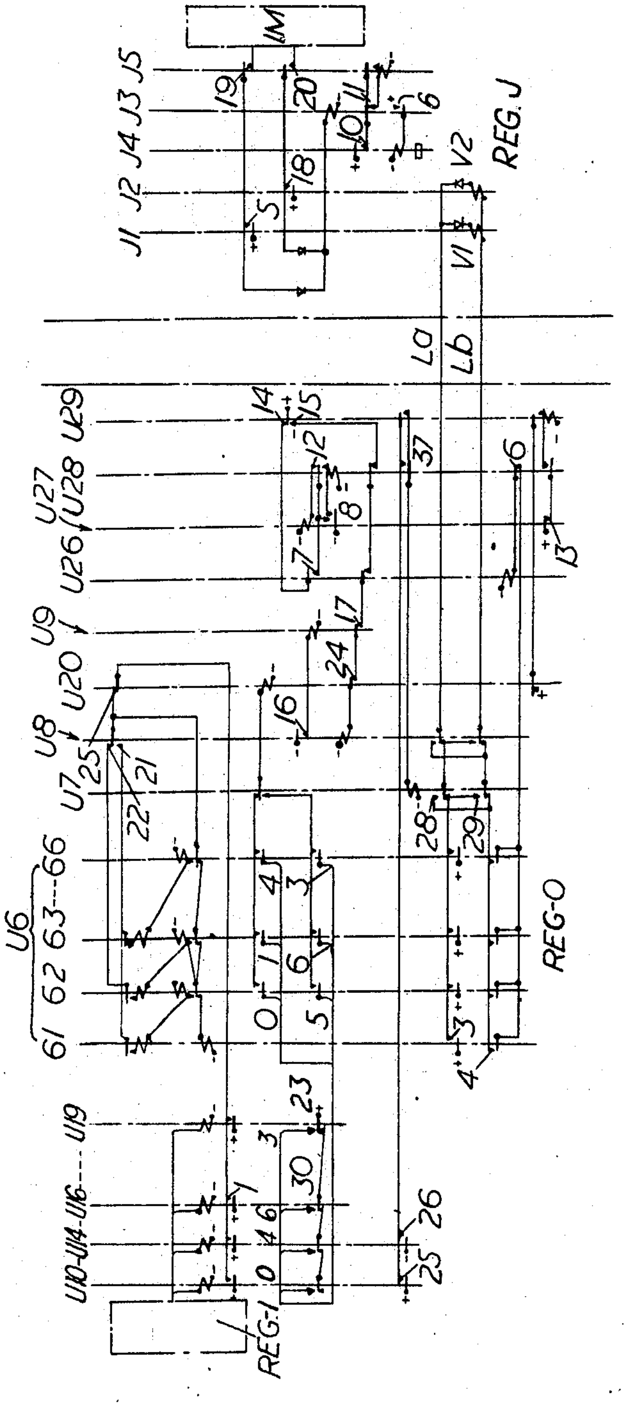

The invention will now be described in detail with reference to the accompanying drawings, in which FIG. 1 shows a block diagram of the system in accordance with the invention, FIG. 2 shows an established speech connection between an extension in exchange A and an extension in exchange B, and FIG. 3 is a circuit diagram explaining the switching process with a pulse transmission device in accordance with the invention.

FIG. 1 illustrates two interworking loudspeaker private branch exchanges A and B, in which the pulse transmission device of the invention can be utilized to advantage.

Each of the exchanges is provided with a number of extensions, with one of these on the transmitting side and one on the receiving side being indicated by means of the respective loudspeaker symbols 1A and 1B. Furthermore, there are line finders LF, final selectors FS, cord circuits CR and local registers REG–1 and REG–2, respectively. The exchanges are connected to each other by means of two-wire lines, which at their ends are terminated by trunk equipments, with one equipment (TLR1) being illustrated for the transmitting side and one (TLR2) for the receiving side. Selection of unoccupied or free trunk equipment is effected by means of a traffic route marker TVR. The trunks in each exchange are also provided with transmitting registers REG–O and receiving registers REG–J.

FIG. 2 shows a block diagram which in principle has been cut out of the diagram shown in FIG. 1 with FIG. 2 illustrating the switching path of a call between an extension in exchange A and an extension in exchange B.

In principle a connection from a calling extension 1A, i.e. a loud speaking set, in exchange A to a calling extension 1B in exchange B is established in the following manner, under the assumption that trunk equipment TRL1 is unoccupied and that register REG–O in exchange A and register REG–J in exchange B are unoccupied. (Compare FIGS. 1 and 2.)

A call is initiated in conventional manner by the caller at extension 1A being connected over line finder LF and cord circuit CR to the local register of exchange A when he presses his call button. When the caller has keyed the number of the called extension and this number has been received in the local register REG–1 the traffic route marker TVR is called in and connects register REG–O, to which the number of the called extension is transferred and in which said number is registered. After this registration, trunk equipment TLR1 is connected over line wires L*a* and L*b* to TLR2 in the receiving exchange. This TLR2 is connected to the switching equipment of exchange B in the same manner as an extension associated with exchange B. Simultaneously, receiving register REG–J of exchange B is connected to TLR2. REG–2 is connected to the switching equipment of loudspeaker private branch exchange B and signals REG–O of exchange A that REG–2 is prepared to receive digit pulses. Pulses corresponding to the number of the called extension are then transferred from REG–O to REG–J.

The digit pulses are converted to a direct current code in REG–J and said code is transferred to the local register REG–2 of the extension in exchange B. When this operation is completed the number of the extension will have been transferred to private branch exchange B, whereafter connection is effected in conventional manner to the extension designated. TVR, REG–1, REG–2, REG–O and REG–J now release. An established connection will thus include the initiating extension connected over switching equipment with its associated speech channel, also trunk equipment TLR1, line wires L*a* and L*b*, interworking trunk equipment TLR2 and switching equipment and speech channel in exchange B, and finally the called extension.

Figure 4:
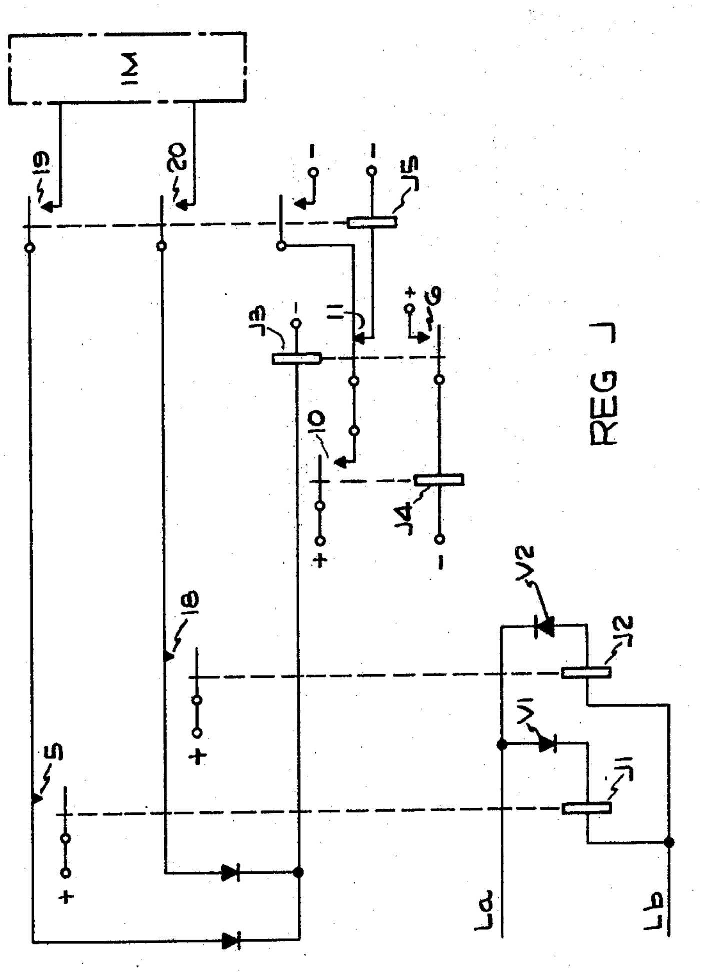

The transmitting device in REG–O and the receiving device in REG–J will now be described, and as an example transmission of pulses corresponding to an arbitrary digit, for instance 6, will be illustrated. In establishing the connection digit markings are transferred from REG–1 to REG–O with one particular relay in REG–O corresponding to each individual digit. FIG. 3 shows a group of ten relays U10–U19 in REG–O representing a store for one digit. FIG. 4 illustrates the elements of Register J on an enlarged scale and employs modified symbols to clarify relationships. The digit 6 selected as an example causes relay U16 to operate, thereby closing contact pair 1 and supplying positive potential for operating relay 61 in relay chain U6. Now positive potential will be supplied to line wire L*a* from contact pair 3, and contact pair 4 will connect negative potential over the coil of relay U26 to line wire L*b*. This will cause operation of relay J1 in receiving register REG–J, with contact pair 5 of relay J1 operating relay J3, which in turn operates time contact relay J4 over contact pair 6. Furthermore, relay U26 supplies a voltage to signal relay U27 via contact pair 7, with the last-mentioned relay in turn operating relay U28 via contact pair 8. If the digit selected had been one of digits 0–4 relay U7 would have operated over contact pair 26 of relays U10–U14 and would have reversed the polarity of line wires L*a* and L*b* over transfer contacts 28 and 29. In operation of relay U28, as above, the L*a*–L*b* loop is opened by contact pair 9, with release of relays U26 and J1 and secondarily J3 as a result. Relay J4 releases slowly, and during this release period holding relay J5 operates over the respective contact pairs 10 (relay J4) and 11 (relay J3). When U28 operates, the operation path of relay U27 opens over contact pair 12, and said relay releases and causes operation of U29 over contact pair 13. Operation of relay U29 serves as a criterion that the operation is completed. When relay U29 operates, the circuit of relay U28 opens over contact pair 14 with the loop closing again over contact pair 9, which results in relay J1 and secondarily J3 operating again. Relay U8 operates over contact pair 15. The last-mentioned relay reverses the polarity of the line, thus causing J2 to operate and J1 to release, as rectifiers V1 and V2 are connected in series with the respective relays J1 and J2. Secondarily to relay U8 relay U9 will operate over contact pair 16 and will open the circuit for U8 (contact pair 17) with U8 releasing. Relay U9 releases secondarily over relay U8 and U8 operates again over contact pair 17 of relay U9. Relays J1 and J2 will now, in response to the polarity of the line, operate in step with the polarity reversals from relay U8, and pulses from contact pairs 5 (relay J1) and 18 (relay J2) will be registered on a pulse receiving chain IM over make contacts 19 and 20 of relay J5.

As a result of the operation of relay U8 relay 62 has previously operated over contact pair 21. At the first release of relay U8 as above relay 61 will release as a result of contact pair 22 opening and relay 63 will operate over contact pair 22. When relay 63 operates, a circuit from contact pair 23 of relay U19 and over contact pair 30 of relay U16 and contact pair 31 of relay U63 will close for operation of stop relay U20, which via contact pair 24 opens the path of operation of relay U8 and simultaneously opens the path of operation of chain U6 over contact pair 25, with chain U6 thereby being restored to its initial or normal position. The polarity of the line wires is cut off when relay chain U6 is restored to normal. When said polarity disappears the transfer of the digit to REG-J will have been completed, and said digit is registered on a pulse receiving chain IM in REG-J pending future use.

While the principles of the invention have been described above in connection with specific apparatus and applications, it is to be understood that this description is made only by way of example and not as a limitation on the scope of the invention.

What is claimed is:

1. A pulse transmission system for loudspeaker private branch exchanges comprising:
   - a receiving side and a transmitting side,
   - a pair of line wires capable of providing completely metallic routes between said receiving and said transmitting sides,
   - a pulse relay at the transmitting side having a separate transfer contact in each line wire,
   - said pair of line wires terminating at the receiving end in two relay coils connected in parallel across the lines,
   - said relay coils each being connected in series with a rectifier of different polarity across the lines,
   - said transfer contacts being adapted in a first position to connect battery voltage to a first one of the line wires and ground voltage to a second one of the line wires,
   - said transfer contacts being adapted in a second position to connect ground voltage to the first one of the line wires and battery voltage to the second one of the line wires,
   - the polarity of said rectifiers permitting the passage of battery voltage to one relay coil and permitting the passage of ground voltage to the other relay coil,
   - whereby pulses representing call numbers are divided into two groups with the digits of the first group having battery voltage on said first line wire as their first pulse and the digits of the second group having ground voltage on the same line wire as their first pulse.

References Cited

UNITED STATES PATENTS

| | | | |
|---|---|---|---|
| 2,712,571 | 7/1955 | Hjertstrand | 179—86 |
| 3,243,516 | 3/1966 | Herter | 179—86 |

FOREIGN PATENTS 1,168,505 10/1962 Germany.

KATHLEEN H. CLAFFY, Primary Examiner

W. H. HELVESTINE, Assistant Examiner